Jan. 3, 1956 A. H. FAULKNER ET AL 2,729,703

TELEPHONE PAYSTATION

Filed May 6, 1954 2 Sheets-Sheet 1

*INVENTORs*
ALFRED H. FAULKNER
ROBERT L. HUFFMAN
*BY* Wm Walter Owen.
ATTY.

Jan. 3, 1956 A. H. FAULKNER ET AL 2,729,703

TELEPHONE PAYSTATION

Filed May 6, 1954 2 Sheets-Sheet 2

INVENTORS
ALFRED H. FAULKNER
ROBERT L. HUFFMAN
BY Wm. Walter Owen
ATTY.

2,729,703

TELEPHONE PAYSTATION

Alfred H. Faulkner, Chicago, Ill., and Robert L. Huffman, Palatine, Ill., assignors to Automatic Electric Laboratories, Inc., Chicago, Ill., a corporation of Delaware Application May 6, 1954, Serial No. 428,003

6 Claims. (Cl. 179—6.5)

This invention relates in general to telephone paystations and more particularly to an arrangement for use with telephone postpay paystations for providing an identifying signal to a called party for informing him that he is being called from a paystation and that he should retain the connection until a proper value of coins are deposited.

Postpay paystations are generally arranged to allow the calling party to initiate a call without the deposit of a coin. The calling party dials the number of the desired called subscriber to extend a connection to the called subscriber. On completion of the dialling operation the called party is signalled and he answers the call. Then, before a talking connection can be established, the calling party must deposit the required value or denomination of coins. This may require a substantial period of time and the called party on hearing nothing may replace his handset and terminate the connection, thereby resulting in the loss of substantial revenue and a great deal of inconvenience to subscribers. This time lapse is especially serious since the conversion from paystation arrangements which require one nickel for the completion of local calls to those requiring two nickels or a dime for the completion of such calls.

It is therefore an objective of this invention to provide an economical and efficient signalling arrangement utilizing an oscillator circuit for the purpose of generating a tone to inform the called party, as soon as he answers the call, that he is being called from a paystation telephone, and that he should await the deposit of the proper coin value after which the signal is removed and a talking connection completed.

A feature of this invention is the circuit arrangement for enabling a transistor oscillator circuit, requiring a minimum of space and power, to be utilized for generating the desired identifying tone.

In addition the tone signal may be used for identifying the value of the coin deposited. The aforementioned and other objects and features will be readily apparent on further reading of the specification and appended claims and perusal of the drawings.

Figure 1:
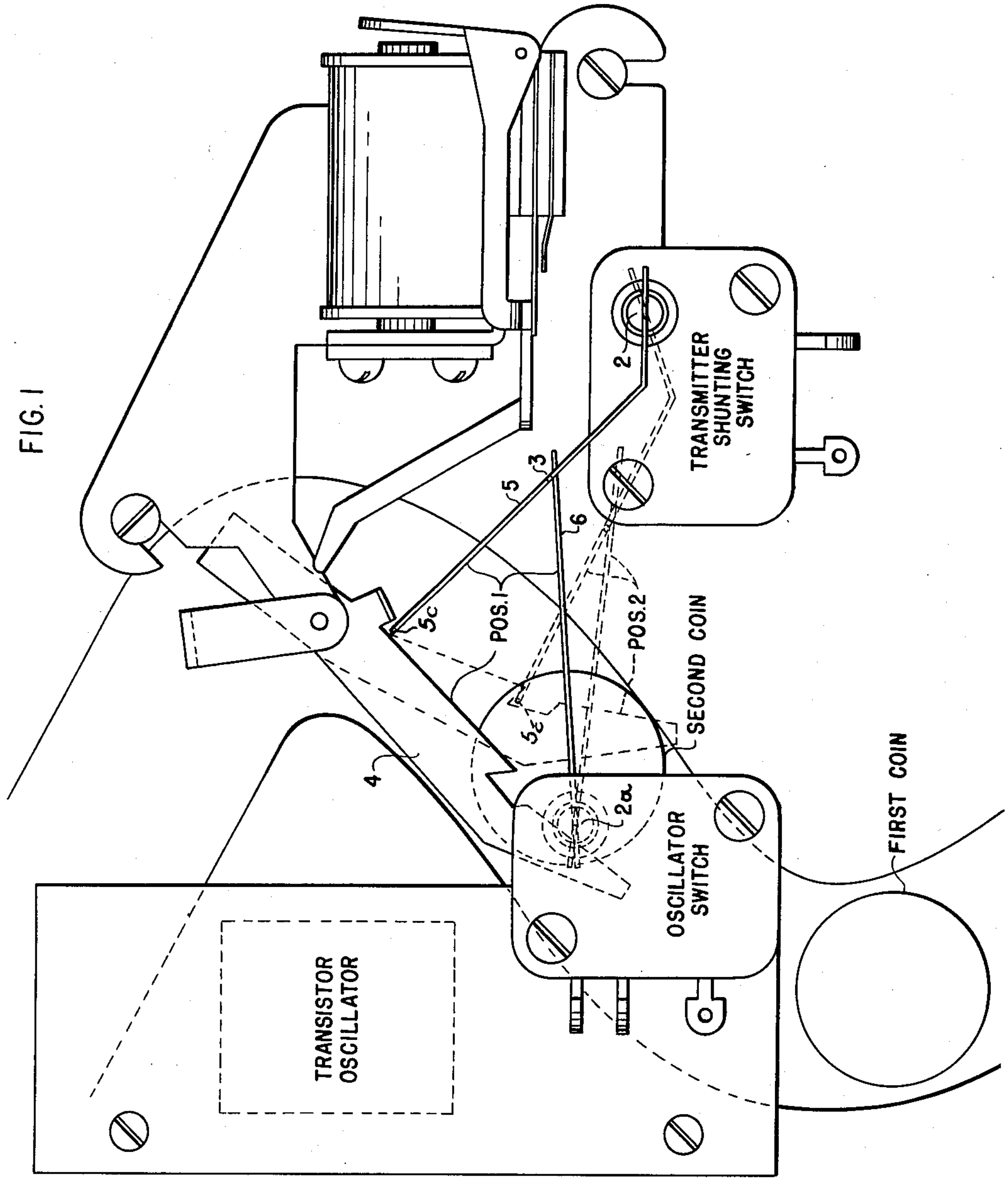

Fig. 1 shows a coin operated lever arrangement such as disclosed in Patent No. 2,674,655 issued to Gallagher on April 6, 1954, modified to extent of having an additional lever, controlled by the lever disposed in the nickel chute as shown in the aforementioned patent, for the purpose of operating a switch which exercises control over the transistor tone oscillator. The above application otherwise discloses all the essentials of a paystation coin receiving means and auxiliary equipment which may be utilized with the present invention.

Figure 2:
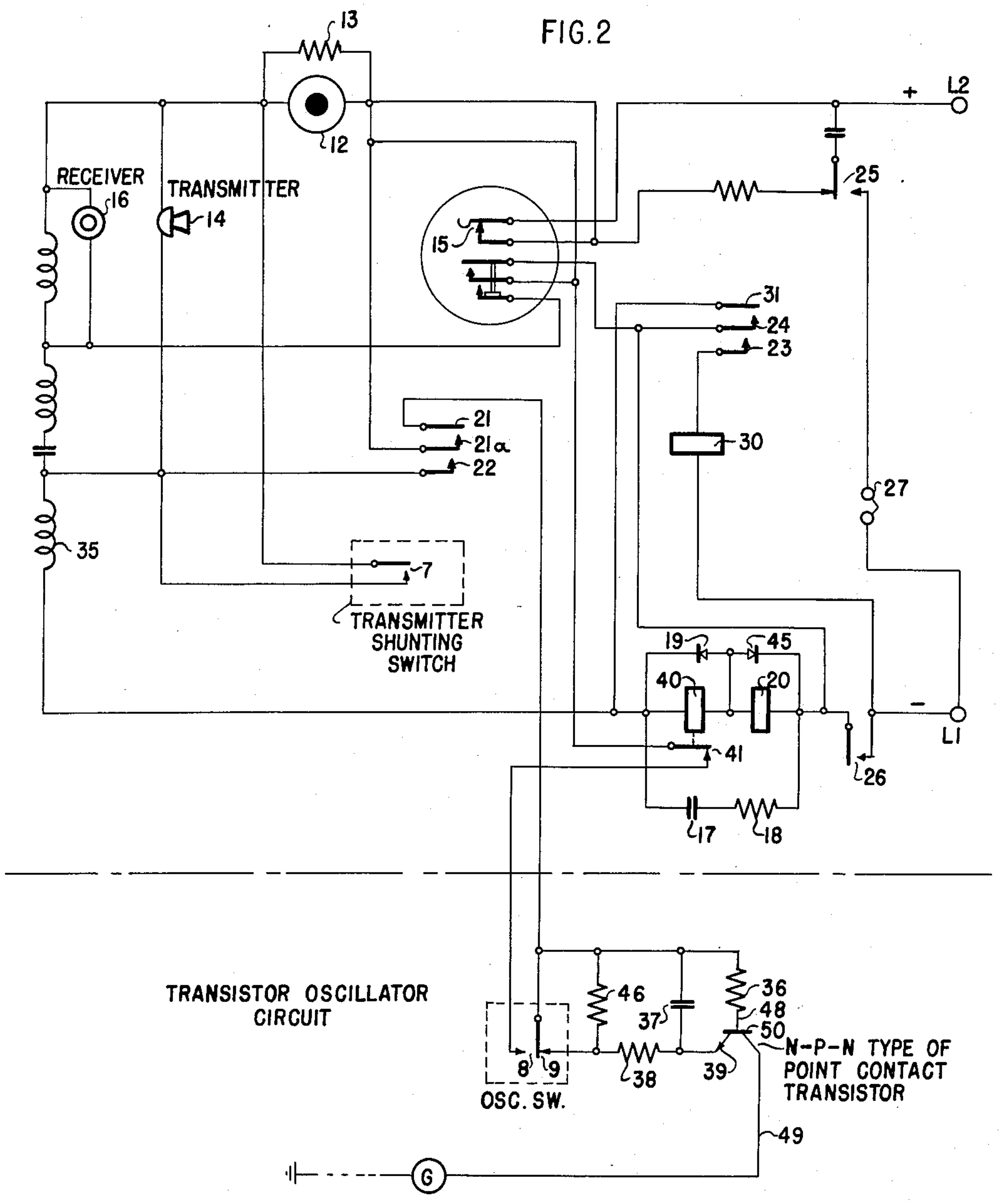

Fig. 2 is a circuit diagram of a postpay paystation circuit showing in addition the circuit arrangement of the transistor tone oscillator.

The calling party initiates a call by removing the handset from its cradle and dialling to extend a connection over line conductors L1 and L2, any well-known type of finder-connector link or other well-known switching equipment to the called party in any well-known manner. On answer by the called party, battery is reversed on line conductors L1 and L2 from the connector in any well-known manner and magnet 20 operates to close the coin springs 21, **21*a* and 22 to each other. This shunts the calling party's receiver and transmitter and connects the transistor oscillator to one side of the line. The transistor 50** is an N—P—N type of point contact transistor. The transistor circuit now provides an audio frequency current, which is transmitted over the line to be heard as a tone by the called party, and he knows that he must await the deposit of the proper coin value. A transistor oscillator circuit of the type used herein is described on pages 289, 290, Figs. 7B and 8 on pages 318 and 319 respectively and Fig. 1 on page 433 of the publication "The Transistor" by Bell Telephone Laboratories, published in 1951 and distributed by the U. S. Department of Commerce.

The calling party on hearing the called party answer deposits the required coin value. If a dime is deposited it falls through its respective chute as described in the aforementioned application and opens springs 21, **21*a* and 22** to disconnect the transistor oscillator from the line and removes the shunt from the calling party's receiver and transmitter so conversation can proceed.

If the calling party deposits a nickel, lever 5 is rotated as described in the aforementioned application and lever 6 is rotated thereby. At 3 in Fig. 1, lever 5 has a portion disposed in a direction perpendicular to the plane of the paper. The upper surface of lever 6 is normally disposed against this perpendicular portion and therefore when lever 5 is rotated counter-clockwise about 2, it causes lever 6 to be rotated in a clockwise direction about 2*a*. Levers 5 and 6, when rotated in the described directions, close contacts 7 and 8 respectively. Contacts 7 maintain the shunt around the calling party's transmitter and receiver while contacts 8 remove the shunt from resistor 46 to provide another tone and maintain the transistor oscillator connected to the line over a different circuit after the nickel has fallen through the chute to open coin springs 21, **21*a* and 22 which open the original connection to the line for the transistor oscillator. Removal of the short around resistor 46 causes a different audio tone to be sent over the line and thus the deposit of a first nickel may be identified by the tone provided on its deposit. Lever 5 on being moved from its original position on deposit of a first nickel moves into engagement with the recess of arm 4 as shown by the dotted lines in Fig. 1 to retain lever 6 in the position indicated by dotted lines and thus transmitter shunting switch contacts 7 and oscillator switch contacts 8 are maintained closed. As described in the aforementioned patent lever 5 is retained in this position until a second nickel is deposited and therefore retains lever 6 in its operated position so that the tone remains on the line after springs 21 and 21*a*** open.

Deposit of a second nickel permits lever 5 and arm 4 to return to the original position as described in the aforementioned application thereby allowing lever 6 to return to its original position. Contacts 7 then open to remove the shunt from the calling party's transmitter and receiver, while contacts 8 open to disconnect the transistor oscillator from the line and restore the shunt around resistor 46. Conversation may now proceed.

In detail a calling subscriber completes a call by first lifting the handset from its cradle to open hookswitch springs 25 and close hookswitch springs 26 to remove the ringer 27 from across the line and to place a shunt around magnet 30 respectively. A circuit to battery and to ground is completed from the switching equipment and over conductors L1 and L2 respectively, dial springs 15, coin transmitter 12 and resistor 13 in parallel, transmitter 14, coil 35, winding of magnet 40, rectifier 45, shunting magnet 20, and hookswitch springs 26. Magnet 20 is prevented from operating by the shunting effect of rectifier 45 while rectifier 19 is arranged to prevent the shunting of magnet 40. Magnet 40 operates and performs the function of insuring that lever 5 and arm 4 are in the position indicated by the solid lines in Fig. 1 in a manner similar to that described for the corresponding equipment in the aforementioned application. It also opens contacts 41 to insure that the oscillator is not connected to the line at this time. The calling party may now operate the dial springs 15 in accordance with the called party's number to in turn transmit impulses over the line to operate the exchange equipment in any well-known manner and connect to and signal the called party. The called party on answering causes battery to be reversed on the line and operates the ring cut-off relay (not shown), to cut-off ring back tone to the calling party and signal him that his call has been answered, all in any well-known manner.

Reversal of battery causes the operation of magnet 20, as rectifier 45 no longer shunts it, from ground on conductor L1, over hookswitch springs 26, winding of magnet 20, rectifier 19 now shunting magnet 40, coil 35, voice transmitter 14, coin transmitter 12 and resistor 13 in shunt, dial springs 15 to battery over conductor L2. Reversal of battery also causes rectifier 19 to shunt magnet 40 thereby causing magnet 40 to restore and close contacts 41 to prepare one circuit for the oscillator which will be described. Magnet 20 on operating also closes coin springs 21, 21a and 22 and causes restoring springs 23 and 24 to engage with each other. Closing of springs 21 to 21a enables the collector circuit 49 to draw current from one side of the line, across the 4.7 kw. resistor 36 in the base circuit 48, transistor 50 to ground on the collector circuit. As the collector circuit begins to draw current the now biased emitter circuit 39 also begins to draw current thereby increasing the current flow in the collector circuit and through resistor 36 until a peak value is reached after which the collector and emitter current fall away rapidly. The .2 mf. condenser 37 has in the meantime been charged and now discharges through the 4.7 kw. resistor 38 and contacts 9 shunting the 27 kw. resistor 46. When condenser 37 is discharged current again flows through resistor 36 and the collector circuit to repeat the process and thus the current flow in the line is varied at an audio frequency rate in accordance with the time constant of condenser 37 and resistor 38. Springs 22 and 21a being closed shunt the coin transmitter 12 and resistor 13, voice transmitter 14 and the receiver 15 from the line. The fluctuating electrical pulsations in the line enable the called party to hear a tone in his receiver thereby informing him that the calling party is still on the line and that he should not replace his handset. Magnet 30 does not operate at this time as it is shunted by hookswitch springs 26.

If a dime is deposited in the coin chute it simply falls through the chute and opens springs 21, 21a and 22 as described in said aforementioned patent to disconnect the oscillator from the line and open the shunt around the calling party's transmitter, receiver and coin transmitter to enable conversation with the called party to proceed while springs 24 and 23 remain closed. It also closes springs 31 to springs 24 and 23 to thereby shunt magnets 40 and 20, rectifiers 19 and 45 and magnet 30 remaining shunted over contacts 26 to improve transmission. Magnet 20 now releases and the talking connection is established from L2, dial springs 15, transmitter 12 and resistor 13 in shunt, transmitter 14, coil 35, and springs 31, 24 and 26. As is well-known in this type of paystation mechanism restoration of the coin springs by a coin does not restore the armature of magnet 20 and therefore magnet 30 must be operated at the termination of a call to perform this function.

The first deposited nickel falls through the coin chute and strikes lever 5, which rotates to allow an arm 5C thereon, extending at a right angle to the plane of the paper to engage the recess in arm 4 as described in the aforementioned patent. Lever 6 is also rotated by lever 5 and is held in its rotated position as long as lever 5 engages the recess in arm 4. Lever 5 on being rotated closes contacts 7 of transmitter shunting switch to provide an additional shunt for the voice transmitter 14 and the receiver 16 of the calling party. Lever 5 closes contacts 8 to connect the base circuit 48 of the transistor and resistor 36 to the line through contacts 41. The aforedescribed transistor operation is repeated, except that now condenser 37 discharges through resistors 38 and 46 so that a different audio frequency is applied to the line and a deposit of the first nickel may be identified as such. The nickel continues to fall through the chute and opens springs 21, 21a and 22 and closes spring 31 to springs 23 and 24. The tone remains on the line as contacts 8 and 41 are closed and receiver 16 and transmitter 14 remain shunted by contacts 7. Magnet 20 releases as previously described on the deposit of a dime when springs 31 and 24 are closed.

The deposit of a second nickel enables lever 5 to be released as described in the aforementioned patent and lever 5, arm 4 and lever 6 return to their normal position, opening transmitter shunting switch contacts 7 and oscillator switch contacts 8 to respectively remove the shunt around the calling party's voice transmitter 14 and receiver 16 and close contacts 9 to restore the transistor circuit to its original condition. Conversation between the parties may now proceed over the circuit previously described.

In the event a toll call is initiated the calling party reaches an operator's position by dialling a predetermined digit. Battery is not reversed on the line and magnet 40 remains operated so that contacts 41 remain open. As magnet 20 is not operated springs 21, 21a and 22 are not closed so that the transistor oscillator circuit is not brought into use. The magnets 40 and 20 and rectifiers 19 and 45 are now shunted from the talking circuit by condenser 17 and the 3 ohm resistor 18 instead of springs 31 and 24. The operator after requesting the deposit of a certain value of coins may identify the same in any well-known manner by the oscillations produced over coin transmitter 12 when the coins strike their respective gongs while falling through their respective chutes in the well-known manner.

On termination of a call to a called subscriber the parties disconnect, and when the calling party replaces his handset, hookswitch springs 26 open to remove the shunt around magnet 30 which operates from battery on conductor L1, winding of magnet 30, springs 23 and 24 and 31, winding 35, voice transmitter 14, coin transmitter 12 and the resistor 13 in shunt, dial springs 15, to ground on conductor L2. If the called party had not yet disconnected, battery remains reversed until he does, however magnet 30 operates regardless of the polarity of current flow over the described circuit and springs 31, 24 and 23 shunt magnets 20 and 40. Magnet 30 operates to open springs 31, 23 and 24 and restore the armature of magnet 20 and thereby enable magnet 20 to operate the springs 21, 21a and 22 on the next local call. On opening of springs 23 and 24, the circuit to magnet 30 is opened and it releases.

Thus, having described our invention and the manner of its operation in a form suitable for use with a telephone paystation but desiring not to limit ourselves thereto we have set forth in the appended claims the subject matter which we believe encompasses our invention.

What is claimed is:

1. For use in a telephone system having a calling line and a called line and means for establishing a connection therebetween and a coin receiving means at said calling line, an electronic oscillator circuit associated with said calling line completed automatically at answer by the party on said called line for signalling said called party to retain said connection, and means operable on the deposit of a coin in said receiving means for disconnecting said oscillator circuit to signal said party at said called line that a coin has been deposited.

2. For use in a telephone system having a calling line and a called line and means for establishing a connection therebetween and a coin receiving means at said calling line, an electronic oscillator circuit associated with said calling line, means operated at answer by the subscriber on said called line for completing said oscillator circuit, said oscillator circuit applying voltages varying at an audio frequency rate to said called line for signalling said subscriber at said called line to retain said connection, and means operable on the deposit of a coin in said receiving means for disconnecting said oscillator circuit to signal said subscriber on said called line that a coin has been deposited.

3. In a system such as claimed in claim 2, a talking circuit prepared on answer by said called line and means associated with said coin receiving means on deposit of a coin of one denomination for causing said oscillator circuit to apply voltages varying at another audio frequency rate to said called line and for maintaining said talking circuit incomplete, said last means operated on deposit of a second coin for rendering said oscillator circuit ineffective and for completing said talking circuit.

4. For use in a telephone system having a calling line and a called line and means for establishing a connection therebetween including the preparation of a talking circuit and a coin receiving means at said calling line, an electronic oscillator circuit associated with said calling line completed on answer by the subscriber on said called line for signalling the subscriber on said called line to retain said connection, and means operated on the deposit of a coin in said receiving means for disconnecting said oscillator circuit to signal said subscriber on said called line that a coin has been deposited and for completing said talking circuit to enable conversation between said calling and called line.

5. For use with a telephone paystation having a coin receiving means and means associated with said paystation for extending a connection therefrom to a called line and for signalling said paystation on answer by a subscriber on said called line, an electronic circuit completed on answer by said called line for applying a tone signal to said called line to signal said subscriber on said called line to retain said connection, and means operated on the deposit of a coin of a particular denomination in said receiving means after said paystation is signalled for disconnecting said circuit to thereby signal said subscriber on said called line that a coin has been deposited, said last means partially effective to disconnect said circuit on deposit of a coin of another denomination and completely effective to disconnect said circuit on deposit of another coin of said other denomination.

6. For use with a telephone paystation having a coin receiving means and means associated with said paystation for extending a connection therefrom to a called line including means for preparing a talking circuit and for signalling said paystation on answer by a subscriber on said called line, an electronic circuit, means automatically operated on answer by said called line for connecting said circuit to said calling line for providing a tone signal to said called line to signal said subscriber on said called line to retain said connection, and means operated on the deposit of a coin of a particular denomination in said receiving means after said paystation is signalled for disabling said last connection and for providing another connection between said circuit and said line to thereby signal the subscriber at said called line that a coin of said denomination has been deposited, said means operated on deposit of a second coin for disconnecting said circuit and for completing said talking circuit.

References Cited in the file of this patent

UNITED STATES PATENTS

| | | |
|---|---|---|
| 1,792,651 | Mathias | Feb. 17, 1931 |
| 1,863,322 | Bennett | June 14, 1932 |